United States Patent [19]

McCoy

[11] 4,360,578
[45] Nov. 23, 1982

[54] METHOD OF ENHANCING THE WETTABILITY OF BORON NITRIDE FOR USE AS AN ELECTROCHEMICAL CELL SEPARATOR

[75] Inventor: Lowell R. McCoy, Woodland Hills, Calif.

[73] Assignee: The United States of America as represented by the Department of Energy, Washington, D.C.

[21] Appl. No.: 228,002

[22] Filed: Jan. 23, 1981

[51] Int. Cl.$^3$ .................... H01M 6/20; H01M 2/16
[52] U.S. Cl. .................................. 429/247; 429/112; 427/126.3; 427/226
[58] Field of Search ................ 429/247, 250, 112; 427/126.3, 226

[56] References Cited

U.S. PATENT DOCUMENTS

| | | | |
|---|---|---|---|
| 2,939,808 | 6/1960 | Nelsen | 427/126.3 |
| 3,404,041 | 10/1968 | Inami | 429/247 |
| 3,645,792 | 2/1972 | Hacha | 429/247 |
| 3,898,096 | 8/1975 | Heredy | 136/6 F |
| 4,110,517 | 8/1978 | Arntzen | 429/133 |
| 4,189,827 | 2/1980 | Eberhart | 429/250 |
| 4,242,427 | 12/1980 | Sterr | 429/250 |

Primary Examiner—Donald L. Walton
Attorney, Agent, or Firm—Hugh W. Glenn; Robert J. Fisher; Richard G. Besha

[57] ABSTRACT

A felt or other fabric of boron nitride suitable for use as an interelectrode separator within an electrochemical cell is wetted with a solution containing a thermally decomposable organic salt of an alkaline earth metal. An aqueous solution of magnesium acetate is the preferred solution for this purpose. After wetting the boron nitride, the solution is dried by heating at a sufficiently low temperature to prevent rapid boiling and the creation of voids within the separator. The dried material is then calcined at an elevated temperature in excess of 400° C. to provide a coating of an oxide of magnesium on the surface of the boron nitride fibers. A fabric or felt of boron nitride treated in this manner is easily wetted by molten electrolytic salts, such as the alkali metal halides or alkaline earth metal halides, that are used in high temperature, secondary electrochemical cells.

5 Claims, No Drawings

METHOD OF ENHANCING THE WETTABILITY OF BORON NITRIDE FOR USE AS AN ELECTROCHEMICAL CELL SEPARATOR

CONTRACTUAL ORIGIN OF THE INVENTION

The United States Government has rights in this invention pursuant to Contract No. W-31-109-38-2937 between the U.S. Department of Energy and Rockwell International.

BACKGROUND OF THE INVENTION

This invention relates to separators for use between electrodes within high temperature electrochemical cells employing molten electrolytic salts as electrolyte. Of particular interest is enhanced wettability of these interelectrode separators by molten salts such as the alkali metal halides or the alkaline earth metal halides.

A substantial amount of work has been done in the development of high temperature electrochemical cells. Cells of this type are contemplated for electric vehicle propulsion and for off-peak power storage. The cells contemplated can include such as the chalcogens or transition metal chalcogenides in the positive electrode and an alkali metal such as lithium, sodium or alloys of these metals with less reactive elements within the negative electrode. A typical high temperature electrochemical cell may include FeS in the positive electrode, LiAl in the negative electrode and an electrolyte of LiCl-KCl.

Compact cell design is desirable to provide high capacity and power per unit cell volume or weight. In compact cells an electrically insulative but porous separator is placed between the positive and negative electrodes to prevent shorting. The interelectrode separator should be wetted with electrolyte to ensure ionic conduction between the electrodes.

Boron nitride has been found to be an excellent choice for the interelectrode separator from the standpoint of compatibility with the cell environment at the high temperatures and for its good electrical insulative qualities. Unfortunately, boron nitride is extremely difficult to wet with the various molten salt electrolytes that are desired for use within these high temperature cells.

Various prior methods have been suggested for enhancing the wettability of boron nitride thereby making it more acceptable for use in molten salt electrochemical cells. Such methods have involved adding agents that enhance wettability in solid mixture with the separator material or by the application of a liquid or flux onto the boron nitride surfaces. In these methods various problems have been encountered control of loading, premature loss of the agent and the formation of conductive bridges within the separator.

Representative literature illustrating the background of the present development are as follows:

U.S. Pat. No. 4,189,827, Treatment of Electrochemical Cell Components with Lithium Tetrachloroaluminate (LiAlCl$_4$) to Promote Electrolyte Wetting by Eberhard et al. This patent shows the use of LiAlCl$_4$ treatment prior to contact of the interelectrode separator material with the molten electrolytic salt.

U.S. Pat. No. 3,898,096 "Lithium-Molten Salt Cell with Transition Metal Chalogenide Positive Electrode" to Heredy and McCoy illustrates various active materials contemplated for use in electrochemical cells employing the various molten salt electrolytes.

U.S. Pat. No. 4,110,517 "Electrochemical Cell Design" to Arntzen illustrates a compact electrochemical cell design that can contain a boron nitride felt as an interelectrode separator.

SUMMARY OF THE INVENTION

Therefore, in view of the above, it is an object of the present invention to provide an improved method of treating boron nitride electrochemical cell components to enhance their wettability of molten salt electrolytes.

It is a further object to provide a method of treating boron nitride fibers in a felt or fabric to enhance wettability by molten alkali metal halides or alkaline earth metal halides.

It is also an object to provide a method of forming an adherent coating on boron nitride fibers to enhance the wettability of such fibers with a molten electrolytic salt in a high temperature electrochemical cell environment.

It is a further object to provide an interelectrode separator for a high temperature electrochemical cell including fiberous boron nitride coated with an adherent layer to promote its wettability by molten electrolytic salts.

In accordance with the present invention, boron nitride is contacted and wet with a solution of a decomposable organic salt of an alkaline earth metal. The wetted boron nitride is dried leaving a deposit of the organic metal salt on the boron nitride surfaces. The boron nitride is then heated to a sufficient temperature to decompose the organic metal salt and form an adherent coating of a ceramic compound of an alkaline earth metal on surfaces of the boron nitride. For purposes of this application, the term "ceramic compound" is intended to define those oxides, borates and carbonates that neither melt nor decompose at the elevated temperatures (e.g. 300°–600° C.) at which molten salt electrochemical cells are operated.

In more specific aspects of the invention, a decomposable formate, acetate or glycollate of an alkaline earth metal such as one selected from magnesium, barium or strontium is provided in aqueous solution with a surfactant such as polyethylene oxide-polypropylene oxide. The solution is used to wet a fiberous boron nitride compound intended as an electrochemical cell interelectrode separator. The wetted boron nitride is gently dried in an environment of about 150°–250° C. and the metal organic salt decomposed at a temperature of about 400°–600° C. to form an adherent ceramic compound of the selected alkaline earth metal on the boron nitride fibers.

The present invention also contemplates porous fiberous boron nitride having fibers coated with an adherent layer of an alkaline earth metal ceramic compound. In a more specific aspect, the adherent layer includes magnesium oxide on the boron nitride fibers and is provided by the thermal decomposition of a magnesium acetate deposit.

DETAILED DESCRIPTION OF THE PREFERRED EMBODIMENT

In one manner of performing the method of the present invention, a boron nitride component is first treated and wet with a solution of a decomposable metal organic salt. The wetting is performed typically by immersing the boron nitride component in the solution. Other methods such as pouring or spraying the solution may also be suitable.

Although any boron nitride component that is to be wet by molten electrolytic salts advantageously may be treated by the present method, it is especially well adapted to the treatment of porous interelectrode separators for electrochemical cells. The porous separator preferably includes fiberous boron nitride in the form of a felt, cloth, paper, matte or other fabric. Felts of intertangled and bonded fibers have been of particular interest for use in high temperature cells with molten salt electrolytes.

The decomposable metal organic salt is one of the alkaline earth metals with an organic anion containing oxygen. Of these metals, magnesium has been found to be the preferred selection but it is reasonable to believe that barium and strontium may also be suitable. The anion can be selected from the acetates, formates and glycollates, but acetate, particularly magnesium acetate, is preferred from the standpoint of solubility and its ability to decompose to an oxide coating at a practical temperature. At temperatures of e.g. 400°–600° C., barium and strontium acetate decompose to a carbonate which may not be as compatable as an oxide with the environment of a high temperature, molten salt electrochemical cell. Although other salts of calcium may be suitable, calcium acetate was found to swell and puff greatly in the subsequently described calcining step of a treated boron nitride felt.

The decomposable metal organic salt is conveniently prepared in aqueous solution at typical levels of 10–50% by weight. However, other solvents such as the alcohols for instance, ethanol, propanol, isopropanol, or their mixtures with water can be appropriately selected. It has been found that the wetting of the boron nitride by the metal organic salt solution is enhanced by the addition of 10–20% by volume isopropanol in water solution. However, the wetting action can be enhanced more conveniently by the addition of a small amount, e.g. 0.1 g/100 ml water, of a conventional surfactant. One surfactant that has been found suitable is a combination of ethylene oxide and propylene oxide available commercially as Pluronic (a Trade name) wetting agents manufacturated by BASF-Wyandotte. Also wetting of boron nitride at slightly elevated temperatures of for example 60°–80° C. has been found to occur at an increased rate.

The wetted boron nitride component is gently dried to prevent vigorous boiling and production of voids in for instance a boron nitride felt. This can be carried out by exposing the wetted layer to a temperature of about 150°–250° C. for about one half to one hour. Typically the wetted boron nitride can be placed in a controlled temperature furnace for that period. The drying step leaves a deposit of the decomposable metal organic salt on the boron nitride, typically on the fibers of a felt or fabric.

After drying the boron nitride component is exposed to higher temperatures in excess of 400° C., e.g. of about 400°–600° C., to calcine the metal organic salt deposit to a more stable ceramic compound as an adherent coating. Magnesium acetate, magnesium formate and probably magnesium glycollate calcine to an oxide or a borate of magnesium. A coating of MgO, $Mg_3(BO_3)_2$ or combination of these ceramic compounds may be formed on the boron nitride depending on conditions. For instance the presence of an alkali metal halide electrolyte during calcination may favor the production of a magnesium borate coating. The calcination of comparable barium or strontium organic salts at these temperatures is expected to provide carbonates of these alkaline earth metals as the ceramic compounds coating the boron nitride.

Porous layers prepared with these ceramic coatings on fiberous boron nitride have been found to exhibit enhanced wetting by molten salt electrolytes. It is contemplated that the wettability of boron nitride by the alkali metal halides, alkaline earth metal halides and mixtures of these various metal halides will be enhanced by the present teachings. Such molten salt electrolytes are well known and many examples are given in the prior literature such as the representative citations presented above. For example, molten salt mixtures of LiCl-KCl, LiF-LiBr, LiF-LiCl-LiBr and LiCl-$CaCl_2$-CaF-KBr are suggested as typical electrolytes whose ability to wet boron nitride may be improved by the present method.

The felts of boron nitride treated in the manner described to increase their wettability are found to have a stiffened or boardy texture. Electron microscopic examination of the fibers in the felts shows adherent coatings of the ceramic magnesium compounds covering substantial portions of the fibers.

The following examples are presented to illustrate the present invention.

EXAMPLE I

A solution containing about 50 g of magnesium acetate 0.4 $H_2O$, about 49.5 ml of water and about 0.5 millimeters of the commercial surfactant Pluronic L92 was used to immerse and wet a boron nitride felt layer of about 2 mm thick and about 15 $cm^2$ on one major surface. The felt was then dried in an oven set at about 250° C. for about ½ hour to leave a deposit of magnesium acetate on the fibers of the boron nitride felt. The dried felt was then heated in the oven to a temperature of about 600° C. to convert magnesium acetate to magnesium oxide. The samples treated in this manner were immersed in molten eutectic LiCl-KCl electrolyte at 450° C. and found to be readily wet. Tests by X-ray diffraction showed the presence of magnesium oxide in the adherent coating on the boron nitride fibers. Weight measurements indicate about 12–15 $mg/cm^2$ as MgO loading. Effective amounts of loading have been found to be about 1.5 to 20 $mg/cm^2$ in a 2 mm thick felt.

EXAMPLE II

In a manner similar to the method of Example I, about 25 g of magnesium formate were dissolved in about 100 ml of water and used for immersing a felt of similar size. After drying at about 200° C. and calcining between 500 and 600° C., and felt was found to wet readily with KCl-LiCl molten electrolyte.

EXAMPLE III

In another procedure, a solution of approximately 50 g of barium acetate and 100 ml water with a suitable surfactant was used in wetting a boron nitride felt. After gentle drying at about 150°–200° C. and firing at 500° C., a barium carbonate layer was found on the fibers of the felt. The felt was readily wet with KCl-LiCl eutectic electrolyte.

Although not tried, it is expected that strontium acetate or other decomposable strontium salt could be substituted for the barium or magnesium salt to decompose into a strontium carbonate layer on boron nitride surfaces. Strontium carbonate has a melting point of about 1500° C. at 60 atmospheres and therefore should be a stable ceramic compound at elevated temperatures. However, like barium carbonate, its long term compatibility with molten electrolytic salts is yet to be determined.

A secondary electrochemical cell having FeS as active positive electrode material, lithium aluminum alloy as negative electrode material and molten LiCl-KCl eutectic electrolyte was provided with a boron nitride felt separator between the electrodes. The separator of about 70 cm$^2$ in area was previously treated in a manner similar to that described in Example I. The cell was cycled for more than 120 cycles over 65 days with utilization based on FeS of about 37-57% at 120 to 40 ma/cm$^2$. Discharge capacities of 15-23 A.h were noted.

It will therefore be seen that the present invention provides a method whereby a porous layer including fibers of boron nitride can be readily wet by a molten alkali metal halide electrolyte by applying a coating of an alkaline earth metal ceramic compound such as magnesium oxide or barium carbonate to the boron nitride surface. The method is particularly well suited for use with boron nitride felts.

Although the present invention has been described in terms of specific methods and materials, it will be clear to one skilled in the art that various changes in the materials and procedures can be made within the scope of the appended claims.

The embodiments of this invention in which an exclusive property or privilege is claimed are defined as follows:

1. A method of treating a felt layer of fiberous boron nitride for use as an interelectrode separator in a secondary electrochemical cell to enhance its wettability by molten electrolytic salt comprising:
   wetting the boron nitride fibers with an aqueous solution of magnesium acetate and a surfactant;
   drying the wetted boron nitride fibers at a temperature of about 150°-250° C. wherein rapid boiling of the solution and void formation in the felt layer are avoided to leave a deposit of magnesium acetate on the surfaces of said fibers; and
   heating the boron nitride to a sufficient temperature to decompose the magnesium acetate and form an adherent coating of magnesium oxide on the surfaces of the boron nitride fibers.

2. The method of claim 1 wherein the boron nitride with magnesium acetate deposit is heated to a temperature of about 400°-600° C. to convert the magnesium acetate to form an adherent layer of magnesium oxide on the boron nitride fibers.

3. An interelectrode separator of boron nitride fibers coated with magnesium oxide by the method of claim 1.

4. An interelectrode separator for use in a secondary electrochemical cell containing alkali metal halides or alkaline earth metal halides as an electrolyte, said separator comprising boron nitride fibers coated with an adherent layer of magnesium oxide formed by heating a magnesium acetate deposit.

5. The separator of claim 4 wherein the boron nitride fibers are fabricated as a layer of felt.

* * * * *